Feb. 14, 1961

D. E. MACCABEE 2,971,380

MANIFOLD PRESSURE GAUGE

Filed Oct. 11, 1957

INVENTOR.
David E. Maccabee

BY
John C. Black
Atty.

2,971,380
Patented Feb. 14, 1961

2,971,380

MANIFOLD PRESSURE GAUGE

David E. Maccabee, West Chicago, Ill., assignor to Stewart-Warner Corporation, Chicago, Ill., a corporation of Virginia Filed Oct. 11, 1957, Ser. No. 689,549

7 Claims. (Cl. 73—411)

This invention relates generally to differential fluid pressure operated indicating instruments and more particularly to an internal combustion engine manifold pressure gauge for aircraft use.

In the past, aircraft manifold pressure gauges have been of two general types. The first and more commonly used type is a very expensive construction in which a pair of balanced, yieldable chambers are utilized, one of the chambers being substantially evacuated and sealed and the other being connected to engine manifold. The two flexible chambers are mechanically connected to a suitable coupling and a movable indicator arm is connected to the coupling by means of a suitable linkage. The evacuated chamber compensates for changes in atmospheric pressure. In this type gauge, any condensed fuel vapors that may be entrapped in the manifold connected chamber will cause no damage to other components of the gauge proper because the chamber is sealed.

In the second and much more inexpensive commercial gauge of this type, a Bourdon tube assembly is utilized to indicate manifold pressure. At a very early stage in the art, the Bourdon tube was connected in sealed relation with the engine manifold. In aircraft use, this became completely unfeasible because the atmospheric pressure acting on the external surface of the Bourdon tube varied with altitude introducing serious error into the gauge. Initial attempts to correct this situation culminated in evacuating and sealing the case in which the Bourdon tube was enclosed to render the gauge insensitive to atmospheric pressure. However, this did not prove to be feasible. The seal could not reliably be effected over a long period of use without introducing a very expensive construction, thus defeating the purpose of a low-cost gauge.

Subsequently, it was learned that a very effective seal can be achieved inexpensively and reliably in the Bourdon tube itself. Consequently, the Bourdon tube was evacuated, then sealed; and the gauge was inexpensively sealed to an extent that, when connected to manifold pressure, only a small error was introduced.

Thus, the latter type construction came into use in low-cost private type aircraft instrumentation. However, over a long period of use considerable trouble with this type gauge has been experienced with little or no alleviation of the trouble being achieved in a practical, inexpensive manner.

For example, a serious defect occurs as a result of hot fuel vapors from the manifold being condensed in the relatively cool case of the gauge due in part to the suction of fuel vapors into the gauge each time the engine is stopped. The latter condition is due to the fact that the manifold pressure returns toward atmospheric pressure much more rapidly than the pressure within the case. Consequently, the low pressure in the case draws fuel vapors from the manifold while the manifold and the case are being restored to atmospheric pressure.

An even greater amount of fuel is condensed in the gauge case as a result of continuing variations in manifold pressure due to normal acceleration and deceleration of the engine during normal flight conditions. Each time that the engine accelerates consequent to further opening of the throttle valve, manifold vacuum decreases followed by a decrease in the gauge vacuum. Reduction in gauge vacuum is accompanied by suction of hot fuel vapors into the gauge case. These vapors are condensed by the relatively cool case.

I propose to overcome the disadvantages of the latter type gauge by the very simplified and inexpensive expedient of venting atmospheric pressure into the case of the gauge by the way of a controlled, dust-eliminating restriction which permits a flow of the air through the gauge case and manifold connection to scavenge fuel vapors from the case and manifold connection continuously as long as a subatmospheric pressure exists in the manifold, that is, continuously during engine operation and subsequent thereto until atmospheric pressure is attained in the case and manifold.

At first glance, this appears to be antagonistic to manifold pressure gauge design, resulting in the destruction of the effectiveness and accuracy of the gauge. However, by controlling the venting of the case through a restriction which is very minute relative to the capacity of the manifold pressure connection, no observable error need be introduced into the gauge. Yet, the vent will effectively scavenge the case and manifold connection continuously during aircraft operation and will return the gauge case to atmosphere in less time than is necessary for manifold pressure to return to atmosphere when the engine is stopped.

I further propose to lower the cost and improve gauges of the latter type by using the restricted venting in an adjustable form which permits, within limits, imperfections in sealing cases on a mass production assembly line. As mentioned above, excessive cost is introduced by a requirement for a perfectly sealed case. This excessive cost is due in part to a high rejection rate on a production line, and due in part to close tolerances required of the various components at the sealing edges of the case. With a controlled vent to atmosphere deliberately introduced, it will be seen that the manufacturing tolerances of the manifold parts of the case at the sealing edges can be relaxed inasmuch as sealing imperfections can be tolerated within limits. For example, at a calibration station on an assembly line, the adjustable vent means can be varied to admit more or less air to compensate for smaller or larger leaks in each idividual case. The combined leakage through the case sealing surfaces and through the adjusted vent will provide an overall case structure with a predetermined amount of leakage, which amount is predetermined in relation with the established manifold connection. Each gauge is then calibrated to compensate for this fixed leak, and no observable error appears in any gauge coming off the line. Infrequently, a gauge may be encountered which has a case sealing surface leak which is greater than the maximum allowable amount. However, this occurs infrequently; and such gauges can be rejected with no appreciable lost production costs.

Other objects and features will be evident upon a perusal of the accompanying description in which.

Figure 1:
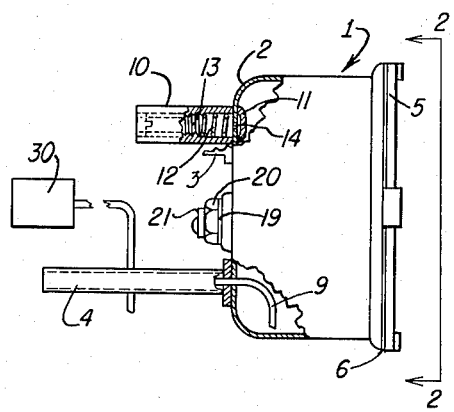
Figure 1 is an elevation view, partially in section, showing the improved gauge.
Figure 2:
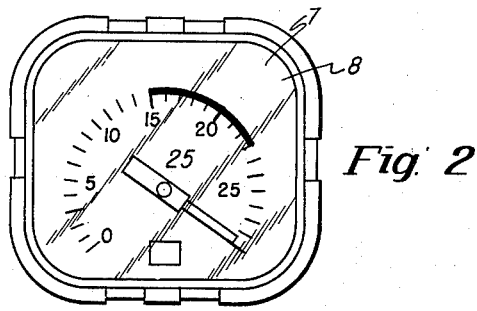
Fig. 2 is an elevation view along line 2—2 of Fig. 1.

With particular reference to Figs. 1 and 2, it can be seen that the gauge 1 comprises a generally square cup-shaped case 2 having a pair of mounting studs 3 and 4 rigidly secured thereto and a sealed window construction including a generally square bezel 5, a gasket 6 and a transparent window 7 (Fig. 2). A conventional face dial 8 is suitably disposed behind the window 7. An engine manifold connection 9 is suitably secured by silver soldering in fluid conduction relationship with the interior of the case 2 and with the manifold 30.

An internally threaded stud 10 is secured to the base of case 2 by silver soldering. The stud 10 also includes a lug 11 which is inserted through an aperture (not shown) in the base of the case 2 and bent over to rigidly secure the stud 10 to the case 2. Internally located in stud 10 is a helical spring 12 pressing against the outside base of the case 2 as well as against an adjustable screw restrictor 13. The purpose of the spring 12 is to provide sufficient mechanical pressure against the restrictor 13 so that the restrictor will maintain its adjustment and will not be effected by vibration. Air from the atmosphere passes between the internal threads of the stud 10 and the external threads of the adjustable restrictor 13, then through a small opening 14 in the case 2 and into the inside of case 2.

Figure 3:
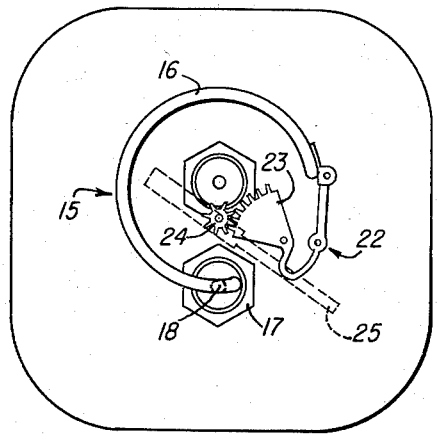
Fig. 3 is an enlarged view of the gauge operating components.

With particular reference to Fig. 3, it can be seen that the conventional Bourdon tube mechanism 15 includes a hollow arcuately shaped tube 16 sealed at its free end and rigidly secured to a hexagonal stud 17 in fluid conducting relationship with a central bore 18 in the stud. The central bore in the stud is suitably sealed, for example, by silver soldering, subsequent to the evacuation of the tube 16.

The stud is rigidly secured to the base of the case 2 by a washer 19 (Fig. 1) and a nut 20 which is threaded on a threaded stud section 21 subsequent to its insertion through an aperture (not shown) in the case 2.

A conventional sector linkage 22 is connected in a suitable manner to the free end of the tube 16. A sector gear 23 of the linkage 22 is pivotally supported on a conventional bracket (not shown) and meshes with a pinion 24 which is rotatably supported by the bracket. An indicating pointer 25 is secured for rotation with the pinion 24 and cooperates with a scale on the face dial 8 to give an indication of instantaneous manifold pressure.

During the assembly of the gauge on a production line, the Bourdon tube assembly and the indicator are calibrated in a vacuum chamber simulating the predetermined leakage. In a separate operation, the case and adjusting screw vent structure are adjusted for the predetermined leakage after assembly of the Bourdon tube and indicator thereon.

When the various components are assembled to provide a unitary case construction, the attempt is made to perfectly seal the components with respect to each other at their connecting surfaces. The purpose of the seal is to prevent the flow of air from the surrounding atmosphere into the interior of the case when the pressure in the case is lower than that of the atmosphere. However, as explained above the seal is frequently imperfect. Also, the magnitude of the imperfect seal will vary from case to case. These varying imperfect seals when maintained within acceptable manufacturing tolerances will be identified in the appended claims as "variable sealing imperfections." It will be appreciated that, once a case is assembled, its sealing imperfection does not thereafter vary.

While there has been described what is believed at present to be the preferred embodiment of the invention, various changes and modifications may be made therein; and it is contemplated to cover in the appended claims all such changes and modifications as fall within the true spirit and scope of the invention.

What is claimed is:

1. A system for measuring the absolute pressure in the manifold of an internal combustion engine comprising: a gauge including a case sealed against the external fluid pressure of the atmosphere and subject to sealing imperfections, including an indicating means secured to the case for indicating instantaneous pressures existing in the manifold, and including an evacuated fluid pressure responsive device mounted within the case and operatively connected to the indicating means, said indicating means and fluid pressure responsive device being calibrated to accurately indicate the manifold pressure with the existence of a predetermined amount of system leakage; structure defining a passageway connecting the interior of the case in fluid conducting relation with the engine manifold; and means including an adjustable highly restricted atmospheric vent structure on the case to provide for the flow of atmospheric air through the vent and case sealing imperfections and through the case to the manifold in an amount substantially equal to the predetermined system leakage, thereby to continuously scavenge the case interior of fuel vapors under all operating conditions and to maintain an accurate indication of instantaneous manifold pressures regardless of the magnitude of the case sealing imperfections.

2. A system for measuring the absolute pressure in the manifold of an internal combustion engine comprising: a gauge including a case sealed against the external fluid pressure of the atmosphere and subject to sealing imperfections, including an indicating means secured to the case for indicating instantaneous pressures existing in the manifold, and including an evacuated Bourdon tube mounted within the case and operatively connected to the indicating means, said indicating means and Bourdon tube being calibrated to accurately indicate the manifold pressure with the existence of system leakage; structure defining a passageway connecting the interior of the case in fluid conducting relation with the engine manifold; and means including an adjustable highly restricted atmospheric vent structure on the case to provide for the flow of atmospheric air through the vent and the imperfectly sealed case to the manifold in an amount substantially equal to the predetermined system leakage thereby to continuously scavenge the case interior of fuel vapors under all operating conditions and to maintain an accurate indication of instantaneous manifold pressures compensated for varying case sealing imperfections from case to case.

3. In an engine manifold pressure gauge of the type in which a substantially sealed case is connected in fluid conducting relation to a source of subatmospheric manifold pressure, in which an evacuated yieldable device is mounted within the case, and in which a pressure indicator connected to the device is operated by the device in accordance with instantaneous fluid pressure within the case, the combination with the case of a highly restricted atmospheric vent structure for admitting a predetermined restricted flow of atmospheric air into the case to scavenge fuel vapors from the case.

4. In an engine manifold pressure gauge of the type in which a substantially sealed case is connected in fluid conducting relation with the engine manifold in the subatmospheric pressure of which is to be indicated, in which an evacuated Bourdon tube mounted in the case responds to the pressure of the fluid surrounding it, and in which an indicating means is controlled by the Bourdon tube to indicate the manifold pressure, the combination with the case of a highly restricted vent for admitting a predetermined flow of atmospheric air into the case under the suction force of the engine manifold pressure, thereby scavenging fuel vapors from the case.

5. An engine manifold pressure indicating system comprising a case sealed subject to limited imperfections incident to manufacturing techniques, structure connecting the case in fluid conducting relation with the subatmospheric manifold pressure to be measured, an indicator, an evacuated yieldable device in the case connected with the indicator for operating the indicator in accordance with the instantaneous pressure of the fluid in the case, and means including a highly restricted vent structure on the case adjusted to provide in combination with the imperfectly sealed case a predetermined flow of atmospheric air to the manifold, thereby to scavenge fuel vapors from the case substantially without affecting the accuracy of the manifold pressure indicator.

6. The system claimed in claim 5 wherein the vent structure comprises an internally threaded annular stud rigidly secured to the case in fluid conducting relation therewith, a screw threaded into the stud defining between the engaging threads thereof a variable restricted passageway between atmosphere and the interior of the case, the resistance to the flow of air through the passageway being a function of the number of engaging stud and screw threads, and a compression spring disposed within the stud and engaging the screw to maintain it in adjusted position.

7. A system for measuring the absolute pressure in the manifold of an internal combustion engine comprising: a case sealed against external fluid pressures subject to sealing imperfections, an indicator mounted on the case for indicating instantaneous pressures existing in the manifold, an evacuated fluid pressure responsive device mounted in the case and operatively connected to the indicating means, structure defining a passageway connecting the interior of the case in fluid conducting relation with the engine manifold, and an adjustable highly restricted atmospheric vent structure on the case for providing a predetermined fluid flow through the vent and the imperfectly sealed case to the manifold, thereby to continuously scavenge the case interior of fuel vapors under all operating conditions and to maintain an accurate indication of instantaneous manifold pressures irrespective within limits of the magnitude of the case sealing imperfections.

References Cited in the file of this patent

UNITED STATES PATENTS

| | | |
|---|---|---|
| 987,219 | Dewrance | Mar. 21, 1911 |
| 2,268,847 | Rafferty | Jan. 6, 1942 |
| 2,775,123 | Salle et al. | Dec. 25, 1956 |